(12) United States Patent
Gadea Ramos et al.

(10) Patent No.: US 11,402,311 B2
(45) Date of Patent: Aug. 2, 2022

(54) PYCNOMETER WITH ACCLIMATION CHAMBER

(71) Applicant: Anton Paar QuantaTec, Inc., Boynton Beach, FL (US)

(72) Inventors: Enrique Gadea Ramos, Lake Worth, FL (US); Freddy Quesada, Lake Worth, FL (US)

(73) Assignee: Anton Paar QuantaTec, Inc., Boynton Beach, FL (US)

( * ) Notice: Subject to any disclaimer, the term of this patent is extended or adjusted under 35 U.S.C. 154(b) by 290 days.

(21) Appl. No.: 16/694,931

(22) Filed: Nov. 25, 2019

(65) Prior Publication Data

US 2021/0156778 A1 May 27, 2021

(51) Int. Cl.
*G01N 9/26* (2006.01)
*G01N 9/02* (2006.01)

(52) U.S. Cl.
CPC ......... *G01N 9/26* (2013.01); *G01N 2009/028* (2013.01)

(58) Field of Classification Search
CPC .. G01N 9/00; G01N 9/02; G01N 9/26; G01N 2009/028
See application file for complete search history.

(56) References Cited

U.S. PATENT DOCUMENTS 4,095,473 A * 6/1978 Batchelor ............... G01N 9/02
526/59
5,074,146 A * 12/1991 Orr .......................... G01F 17/00
73/149
6,990,848 B2 * 1/2006 Dummer ............ G01N 15/0893
73/38

(Continued)

FOREIGN PATENT DOCUMENTS

CN 107884022 A 4/2018
JP S61170621 A 8/1986

(Continued)

OTHER PUBLICATIONS

Rambaud, D.; International Search Report in PCT/IB2020/060216; pp. 1-5; Mar. 26, 2021; European Patent Office, P.B. 5818, Patentlaan 2, 2280 HV Rijswijk, Netherlands.

(Continued)

*Primary Examiner* — Natalie Huls
(74) *Attorney, Agent, or Firm* — Robert A. Blaha; Smith Tempel Blaha LLC

(57) ABSTRACT

An arrangement for measuring a volume of a solid or liquid sample includes a first chamber for accommodating the sample; at least one second chamber connectable to the first chamber; a third chamber connectable to a gas supply source and connected to a gas entry path leading to at least one of the first chamber and the second chamber; a pressure sensor; plural gas paths comprising plural valves; a temperature equalization system configured to temper at least the first chamber, the second chamber and the third chamber to substantially a same temperature, wherein the gas paths and the valves are arranged and connected such as to allow, filling gas out of the third chamber into at least one of the first chamber and the second chamber, and measuring a pressure in at least one of the first chamber and the second chamber.

17 Claims, 2 Drawing Sheets

(56) References Cited

U.S. PATENT DOCUMENTS

| | | | | |
|---|---|---|---|---|
| 8,413,488 B2 * | 4/2013 | Belitsch | ............... | G01N 9/04 |
| | | | | 73/54.09 |
| 10,337,902 B2 * | 7/2019 | Abate | ............... | G01F 17/00 |
| 2010/0269577 A1 * | 10/2010 | Jorion | ............... | G01F 17/00 |
| | | | | 73/149 |
| 2017/0010196 A1 | 1/2017 | Nakai et al. | | |
| 2017/0030817 A1 | 2/2017 | Nakai et al. | | |

FOREIGN PATENT DOCUMENTS

| | | | |
|---|---|---|---|
| JP | H0669749 U | | 9/1994 |
| JP | 2005069951 A | * | 3/2005 |

OTHER PUBLICATIONS

Rambaud, D.; Written Opinion in PCT/IB2020/060216; pp. 1-9; Mar. 26, 2021; European Patent Office, P.B. 5818, Patentlaan 2, 2280 HV Rijswijk, Netherlands.

* cited by examiner

PYCNOMETER WITH ACCLIMATION CHAMBER

TECHNICAL FIELD

Embodiments of the invention generally relate to an arrangement for measuring a volume of a solid or liquid sample in the field of pycnometry and further relates to a manufacturing method for manufacturing the arrangement.

TECHNOLOGICAL BACKGROUND

For determining a volume of a solid or liquid sample (for example for true-density determination), pycnometry is utilized, wherein a gas phase substitution method or a gas expansion method is performed. Thereby, a sample chamber in which the sample to be measured is located is filled with a gas and the gas pressure is measured. Then, the gas is expanded into an expansion chamber and the resulting pressure is measured. Using the Boyle-Mariotte law, the volume of the sample may be determined based on the pressure measurements and based on known volumes of the sample chamber and the expansion chamber.

The document U.S. Pat. No. 4,095,437 A discloses a pycnometer designed to measure the density of a particular porous polymer sample. A computer calculates the density of the sample from the sample weight and the volume of the sample determined by measurement of a super-atmospheric gas pressure in the gas reservoir when isolated from the sample cell and the equalized pressure established when the gas reservoir is placed in open communication with the sample cell. The gas reservoir is joined to a gas cylinder.

The document US 2017/0030817 A1 discloses a true density measurement device applying a gas phase substitution method. A sample chamber is pressurized through the introduction of an inert gas and the gas is released into an expansion chamber. The volume of the expansion chamber is modified by insertion or withdrawal of a volume modification member.

The document US 2017/0010196 A1 also discloses a true density measurement device applying a gas phase substitution method. The sample chamber can be closed by a lid which presses against the rim of the opening of the sample chamber to hermetically seal the sample chamber.

Conventionally known pycnometers may have problems regarding prolonged measurement time. In particular, it has been observed that long equilibration times are necessary increasing the time needed for each measurement.

SUMMARY

Thus, there may be a need for an arrangement for measurement of a volume of a solid sample, wherein measuring times are reduced and/or the accuracy of the measurement results are improved.

This need may be met by the subject-matter of the independent claims. The dependent claims specify particular embodiments of the present invention. It should be understood, that even though the claims as appended do not comprise multiple dependencies, any dependent claim may refer to any of the preceding dependent claims according to embodiments of the present invention. Thus, in the document as filed is included that all dependent claims refer to one of the preceding claims.

According to an embodiment of the present invention it is provided an arrangement for measuring a volume of a solid or liquid sample, comprising: a first (e.g. sample) chamber for accommodating the sample; at least one second (e.g. reference or expansion) chamber connectable to the first chamber; a third chamber (e.g. acclimation chamber) connectable to a gas supply source and connected to a gas entry path leading to at least one of the first chamber and the second chamber; a pressure sensor; plural gas paths including the gas entry path comprising plural valves; a temperature equalization system configured to temper at least the first chamber, the second chamber and the third chamber to substantially a same temperature, wherein the gas paths and the valves are arranged and connected such as to allow, filling gas out of the third chamber into at least one of the first chamber and the second chamber, and measuring a pressure in at least one of the first chamber and the second chamber.

The arrangement may be configured as a pycnometer. The third chamber may also be referred to as an acclimation chamber or conditioning chamber for conditioning the gas contained in the third chamber to a temperature substantially being equal or at least similar (for example to an accuracy of less than ±0.5° C. or less than ±0.1° C.) to the temperature of the first chamber and/or the second chamber. The gas used during measurement may for example comprise an inert gas, such as helium.

OVERVIEW OF EMBODIMENTS

In some embodiments, the arrangement may comprise two or more pressure sensors.

The gas entry path may, selectively, allow to fill the first chamber or the second chamber, for example in two different measurement modes. In other embodiments, the gas entry path only leads to the first chamber without being connected or leading to the second chamber. In still other embodiments of the present invention, the gas entry path leads or is connected to the second chamber but no connection is possible to the first chamber. For allowing selectively connecting the gas entry path to either the first chamber or the second chamber, several gas paths and respective valves are necessary which will be described below in detail. Thus, embodiments of the present invention provide an arrangement wherein first the first chamber is filled with gas and later during the measurement, the gas is expanded into the second chamber. Other embodiments of the present invention provide an arrangement, wherein the gas is filled first into the second chamber and later the gas is expanded into the first chamber. Thus, embodiments of the present invention are not restricted to an arrangement for measuring a volume of a solid sample, wherein filling and expanding the gas may be performed bidirectionally.

The temperature equalization system may be implemented in different configurations in different embodiments. In some embodiments the temperature equalization system comprises two or more metal blocks separated from each other and not in thermal contact with each other, each block harboring one or more of the first, the second and the third chamber.

That is, a first block harboring the first chamber, a second block harboring the second chamber, and a third block harboring the third chamber may be provided. Each block may separately be equipped and controlled with tempering equipment, such a Peltier element for adjusting the respective temperature.

In another embodiment a first block may harbor the first chamber and the second chamber, while a second block (separate from and not in thermal contact with the first block) harbors the third chamber. Each block may separately be equipped and controlled with tempering equipment, such a Peltier element for adjusting the respective temperature.

According to an embodiment of the present invention the temperature equalization system comprises: a metal assembly in thermal contact with the first chamber, the second chamber, the third chamber and at least a portion of at least one of the gas paths and in thermal contact with at least one of the valves.

The metal assembly may harbor and/or include the first chamber, the second chamber and the third chamber or may only be in thermal contact with these chambers. When the chambers are harbored or included in the metal assembly, these chambers may be contained within the metal assembly, such as implemented as recesses or open spaces in the metal assembly where the material of the metal assembly is removed. The chambers or at least one of the chambers may for example be manufactured by milling a particular region out of a solid block of metal or several metal portions, as will be described in detail below. In particular, when the metal assembly harbors or includes at least one of these chambers, in particular all, i.e. the first, the second and the third chamber, a gas which may be present in one or more of the chambers may in a fast manner equilibrate regarding its temperature to the temperature of the metal assembly. In particular, also the gas contained in the third chamber may, at the start of a measurement, be at the temperature of the entire metal assembly being also equal to the temperature of the gas within the first chamber and/or the second chamber. Thus, when introducing or filling the gas from the third chamber into either one the first chamber or the second chamber, equilibration time for equilibrating the filled gas to the temperature of the first chamber and/or the second chamber can be reduced. As a result, a pressure measured by the pressure sensor may after a shorter time range reach an equilibration value. Thus, the arrangement allows an accelerated pycnometric measurement of the sample.

The metal assembly may comprise a single metal block, for example an aluminum block, or may comprise plural metal assembly portions connected to each other, for example by bolts. The first chamber and/or the second chamber (and potentially also a third chamber) may be established as a respective recess within the metal assembly or metal structure which may for example be realized by milling or cutting. In this case, the metal assembly may harbor the first chamber, the second chamber and at least one gas path and also optionally the third chamber. Thus, limiting walls of the respective chambers may be formed by material of the metal assembly itself. In other embodiments, the metal assembly may comprise recesses into which distinct containers providing the different chambers are inserted.

The third chamber is different from a mere gas conduit in that the volume of the inner space of the third chamber is of considerable size such as to allow filling the gas inside the third chamber into one of the first or the second chamber at a desired predetermined target pressure without requiring any additional gas to be used, for example from the external gas source. Thus, all gas needed for a typical pycnometric measurement may already at the beginning of the measurement be contained within the third chamber. The third chamber may for example have a cuboid shape or a cylindrical shape. Walls of each of the chambers may be made of a high heat conductive material, such as metal, in particular aluminum or an aluminum alloy.

The gas paths and valves may be arranged and connected such as to, during a first measurement mode, fill the gas out of the third chamber into the first chamber and may be arranged and connected, in a second measurement mode, to fill the gas out of the third chamber into the second chamber. Thus, embodiments of the present invention provide an arrangement allowing bidirectional operation (i.e. either first filling the first chamber or first filling the second chamber and afterwards expanding the gas into the second chamber or the first chamber, respectively), wherein the gas is introduced to the first or the second chamber from the third chamber providing gas already thermally equilibrated to the temperature of the metal assembly. Other embodiments provide only an unidirectional operation from the third chamber as a filling source for the first chamber or the second chamber.

The arrangement may in particular be configured as a pycnometer suitable for measuring the volume of the solid sample and/or the (true) density of the solid sample. In order to determine the density of the solid sample, besides the determination of the volume of the solid sample, also the determination of the mass of the solid sample may be performed by the arrangement (e.g. with an internal balance) or by an auxiliary equipment. Alternatively, if the density of the solid sample is known, the arrangement may be suitable for measuring the volume of the solid sample; the mass of the solid sample may then be determined from these two parameters.

The arrangement may be operable for example in a temperature range between 5° C. and 50° C. Therefore, the chambers and also the gas paths may be tempered to a desired temperature within the above-mentioned temperature operating range. In particular, all constituents of the arrangement being in thermal contact with the measurement gas may be tempered to a same operating temperature, for example in an error range of ±1° or less.

The solid sample may comprise a foam and/or a powder and/or a compact sample or the like. The volume of the solid or liquid sample may for example be in a range between 0.1 $cm^3$ to 1000 $cm^3$.

The first chamber and the at least one second chamber may provide an inner volume or inner space delimited by wall sections. The chambers may for example substantially have a cylindrical shape or cuboid shape. The chambers may for example be delimited by distinct wall sections of respective containers or may for example be delimited by material of a metal assembly with which the chamber may be in thermal contact or in which the chambers may be harbored or included.

The first chamber may for example comprise a lid or a closing section allowing to open and close the first chamber. The lid may for example be configured as having a gripping portion allowing a user to grasp the lid and engage the grip (for example by a rotation movement) at engaging portions at the first chamber. When the first chamber is opened, the sample may be introduced into the first chamber. After having placed the sample into the first chamber (also referred to as sample chamber), the first chamber may be closed by the lid, namely closed in a gas-tight manner.

An operating relative pressure after filling for example the first chamber or filling the at least one second chamber may for example amount to be in the range between −1 bar and 10 bars, for example. The lid may comprise sealing equipment to maintain the gas at the desired operating pressure within the first chamber when the first chamber is closed by the lid.

The at least one second chamber (also referred to as reference chamber) may not comprise a lid. The at least one second reference chamber may be connected to the first chamber when the third valve as well as the fourth valve are in an open state.

When it is said that a chamber is connectable or connected to another chamber, it may mean, that gas contained in the chamber may freely communicate with the space or inner volume of the other chamber. Thus, when for example the first chamber is connected with the second chamber, the gas in the first chamber and the gas in the second chamber may mix with each other and may distribute across the first chamber as well as the second chamber to reach a same pressure and completely fill the free volume of the first chamber and the inner volume of the second chamber. When it is said that a chamber is connected with a particular valve it is meant that gas contained in the chamber and/or the respective valve may freely communicate with the valve or the chamber, respectively.

The pressure sensor may for example be configured to measure a relative pressure in an operating range of between −1 bar and 10 bar. The pressure sensor may also be tempered to have substantially a same temperature as the chamber and also as the valves. All gas paths, valves and all chambers may be gas tight also in the above-mentioned pressure range.

According to an embodiment of the present invention, a size of an inner volume of the third chamber amounts to between 0.1 times and 100 times a size of an inner volume of one of the first chamber and the second chamber.

The gas contained within the third chamber may be pressurized, in particular at a pressure at least as high as or even higher than required as a target pressure for filling either the first chamber or the second chamber. In particular, the gas filled into the third chamber may for example have a relative pressure of between 0.1 and 200 bars.

The relative target pressure after filling the first chamber or the second chamber may for example be in the range of −1 and 10 bars. When the inner volume of the third chamber has the size as specified above, the gas needed to fill either the first chamber or the second chamber may completely be contained in the third chamber, without requiring to fill into the first or the second chamber additional gas previously not equilibrated within the third chamber and not contained within the third chamber. Thus, typical measurement protocols may be complied with.

According to an embodiment of the present invention, the third chamber encloses a metallic material providing high surface area, wherein the metallic material is in thermal contact with the metal assembly, wherein the metallic material comprises at least one of: a fibrous web, a sintered structure, a loose material, a mesh, a fleece, a fabric, a non-woven fabric, a woven fabric, and a mat.

The metallic material may further comprise metallic spheres, metallic powder or any other material that improves the thermal conductivity between the gas and the chamber. When metallic material is enclosed within the third chamber and is thermal contact with the metal assembly, the gas within the third chamber surrounding the metallic material may in a fast manner be brought to the temperature of the metal assembly. Since the temperature of the metal assembly substantially corresponds or equals to the temperature of the first chamber and the second chamber, also the equilibration time for equilibrating the gas to the temperature of the first chamber or the second chamber after filling the gas into the respective chamber may be shortened. The metallic material may be configured in a number of different manners. Provided that the surface area of the metallic material is much larger than the surface area of the metallic material when the metallic material would be in a continuous or compact constitution.

According to an embodiment of the present invention, the arrangement further comprises a tempering equipment for tempering the metal assembly to a desired temperature, an insulation surrounding the metal assembly.

The tempering equipment may comprise an electrical heater and cooler, in particular at least one Peltier element enabling heating and/or cooling the metal assembly. The metal assembly may provide a significant thermal capacity and may be a good heat conductor. Essentially, the temperature may be equal or at least very similar across the entire extent of the metal assembly. Therefore, also the temperature within the different chambers and the gas paths may substantially be same or at least very similar. Since pressure and/or volume of a gas dedicatedly or sensitively depends on the temperature, providing equal temperature in all involved portions of the measurement may improve the reliability and/or accuracy of the volume determinations. To provide a bore in the metal assembly may easily be achieved. Thereby, distinct elements for the gas path may not be required or necessary any more.

According to an embodiment of the present invention, the metal assembly comprises: a first metal portion harboring the first chamber, a second metal portion harboring the second chamber, and a third metal portion harboring the third chamber, wherein the first metal portion is mounted at a side flat surface to a side flat surface of the second metal portion and another side flat surface of the second metal portion is mounted at a side flat surface of the third metal portion.

When the metal assembly is assembled from the first metal portion, the second metal portion and optionally the third metal portion, an easy construction is provided being easily manufacturable. Interfaces between portions of one or more flow paths between adjacent metal portions of the metal assembly may be provided with a respective seal, such as O-ring, to prevent leakage at mounting interfaces of the metal portion. Thereby, a compact arrangement may be achieved.

According to an embodiment of the present invention, the gas paths and valves comprise at least one of: a first gas (e.g. supply) path including a first valve, the first gas path being on one end connected, via the first valve, to the first chamber and on the other end connected to the gas entry path; and a second gas (e.g. supply) path including a second valve, the second gas path being on one end connected, via the second valve, to the second chamber and on the other end connected to the gas entry path.

According to an embodiment of the present invention, the arrangement comprises at least one of: a third gas (e.g. measurement) path including a third valve, the third gas path being on one end connected to the first chamber and on the other end connected, via the third valve, to the pressure sensor; and a fourth gas (e.g. measurement) path including a fourth valve, the fourth path being on one end connected to the second chamber and on the other end connected, via the fourth valve, to the pressure sensor.

Any of the gas paths may be formed by a gas conduit, for example having substantially a circular cross-sectional shape, wherein the gas path is adapted to guide or carry gas substantially without contaminating the gas, without adsorbing components of the gas and without changing the composition of the gas. The gas paths and the chambers may be suitable to be filled or to guide any of conventionally known measurement gases, such as inert gases, such as noble gas or for example nitrogen. In particular, helium may be utilized as a measurement gas. All valves, i.e. the first, the second, the third and the fourth valve may be configured essentially in a same manner, in particular as a solenoid valve, further in particular as a two-way latching valve.

The first gas path may also be referred to as a first gas supply path, since it may provide the opportunity to supply measurement gas into the first chamber. The second gas path may also be referred to as a second gas supply path, since the second gas path may enable to fill measurement gas into the second chamber. The third gas path may also be referred to as a third gas measurement path, since the third gas path may be utilized during the measurement for expanding the gas from the first chamber or for connecting the pressure sensor with the first chamber, in order to measure the pressure after the measurement gas has been filled into the first chamber. The fourth gas path may also be referred to as a fourth gas measurement path, since it may be utilized during the measurement to expand the gas already contained within the first chamber (or the second chamber) via the third valve and the fourth valve to the second chamber (or the first chamber). In this situation, the fourth gas path connects the first chamber and the second chamber and also connects both inner volumes of both chambers to the pressure transducer or pressure sensor. According to embodiments of the invention, the third gas path and the fourth gas path may be utilized to connect the first chamber and the second chamber with each other and with the pressure sensor.

By providing the first, second, third, fourth gas paths including the respective first, second, third, fourth valves, the arrangement allows a measurement of the volume of the sample in two different operation modes. In a first operation mode, first the first (sample) chamber is filled with the measurement gas and is then expanded into the second (reference) chamber. In a second measurement mode, first the second chamber is filled with the measurement gas which is then expanded into the first chamber. In both measurement modes, the sample may be placed into the first chamber. By providing two different measurement modes characterized by opposite flow directions of the measurement gas to be expanded, a variety of different types of samples can accurately and reliably be measured.

According to an embodiment of the present invention, the arrangement comprises at least one of: a fifth gas (e.g. vent) path including a fifth valve, the fifth gas path being on one end connected, via the fifth valve, to the first chamber and on the other end connected to a gas sink; and a sixth gas (e.g. vent) path including a sixth valve, the sixth gas path being on one end connected, via the sixth valve, to the second chamber and on the other end connected to a gas sink.

The fifth gas path may also be referred to as a fifth gas vent path, since it may be utilized for venting the first chamber and/or also the second chamber and the connecting gas paths after having performed a measurement according to the first measurement mode. Alternatively, the fifth gas path may be utilized to vent the chambers and gas paths after having performed a measurement according to the second measurement mode. Therefore, only one vent is needed and may be positioned at any place in the instrument.

The sixth gas path including the sixth valve may be utilized for venting the system after a measurement has been performed using the first measurement mode. Alternatively, venting the sixth valve may also be performed after a measurement according to the second measurement mode has been performed. Embodiments of the present invention include only one of these valves, i.e. the fifth valve and the fifth gas path or the sixth valve and the sixth gas path. In this case, either one of the fifth valve or the sixth valve may be utilized (and present) to vent the system when any of the operational measurement modes has been performed. In other embodiments, the fifth valve as well as the sixth valve and also the fifth gas path as well as the sixth gas path may be present.

According to an embodiment of the present invention, the arrangement further comprises a controller adapted to control a state of at least one of the first valve, the second valve, the third valve, the fourth valve, (and in particular the fifth valve and the sixth valve), such as to allow measurement of the sample volume selectively according to a first measurement mode or a second measurement mode, wherein in the first measurement mode, the first chamber in which the sample is accommodated is filled with gas from the third chamber and the gas is later expanded into the second chamber, wherein in the second measurement mode, the second chamber is filled with gas from the third chamber and the gas is later expanded into the first chamber in which the sample is accommodated.

The controller may be communicatively connected to the different valves via electrical and/or optical and/or wireless control lines. The controller may also be communicatively connected with the pressure sensor, for example for reading out pressure measurement signals.

Each of the valves may be adapted to be in two different states, namely an open state and a closed state. In the closed state, the respective valve may interrupt gas communication between different sides of the respective valve. In the open state, the respective valve may freely allow communication of gas (for example in one of the gas paths) across different sides of the respective valve. The respective valve may comprise simple solenoid valves which may be in a closed state unless activated by in particular a control signal or control current. In other embodiments, for switching the valve between the closed state and the open state, a single current pulse may be provided to the respective valve configured as two-way latching valve.

The controller may be adapted to control the state of the first valve, the second valve, the third valve, the fourth valve and in particular also a fifth valve and a sixth valve which will be explained further below. Controlling the state of the respective valve allows performing a measurement method for determining the volume of the solid sample. The controller may for example control respective drivers for the valves which may, depending on control signals as transmitted from the controller, generate and transmit suitable driver signals to adjust or change the state of the respective valve.

The gas entry path may for example be connected with a gas container holding the measurement gas. The gas container may be in thermal contact or may not be in thermal contact with the respective chambers and the valves. In particular embodiments of the present invention, the gas entry path including a gas container (also referred to as a third chamber) may be in thermal contact with and in particular may be maintained at a same temperature as the first chamber, the second chamber and the different valves.

For adopting the first measurement mode or the second measurement mode, no physical change or rearrangement of any portions of the arrangement may be necessary. Merely by appropriately switching the states of the different valves, the first measurement mode or the second measurement mode may selectively be established. Thereby, a variety of different types of samples may reliably be measured. For example, a first type group of samples may best be measured using the first measurement mode and a second type group of samples may best be measured by a second measurement mode. A user operating the arrangement may for example simply enter into an input interface the respective type of the sample desired to be measured. Based on the entered type of the sample, the arrangement may automatically switch to the suitable measurement mode, i.e. to the first measurement mode or to the second measurement mode without any further required interference/input by the user. In other embodiments, the type of the measurement mode, i.e. the first or the second measurement mode, may directly be entered by a user.

According to an embodiment of the present invention, the controller is adapted to cause when in the first measurement mode: opening the first valve and the third valve, to allow filling the first chamber with gas from the third chamber, closing the first valve and measuring a first pressure related to the first measuring mode using the pressure sensor (e.g. after equilibration is reached), e.g. while the first, second, fourth, fifth and sixth and (seventh and eighth) valve are closed; opening the fourth valve (and optionally opening the seventh valve leading to a further second chamber, to allow expanding the gas also into the at least one second chamber and measuring a second pressure related to the first measuring mode, wherein the arrangement is adapted to calculate the volume of the sample based on the first pressure and the second pressure both related to the first measuring mode.

Opening the first valve and the third valve may be performed simultaneously or subsequently. For example, the third valve may be opened, i.e. meaning to set the third valve into the open state, and the first valve may be opened simultaneously or after opening the third valve. The first and the third valve may be kept open until the pressure within the first chamber and the third gas path and also the first gas path (as measured by the pressure sensor) reaches a target pressure which may for example be in a range of between −1 bar and 10 bar. After reaching the target pressure, the first valve may be closed (i.e. set into the closed state) and the first pressure (related to the first measurement mode) may be measured using the pressure sensor. Thereby, a pressure may be measured by the pressure sensor, until the measured pressure does not change by a configurable threshold, thereby specifying a change rate limit/threshold. Thus, it may be waited until the gas temperature within the sample chamber and the third gas path substantially assumes the temperature of the wall section(s) limiting the sample chamber and the material limiting the third gas path. Thus, the first pressure may be determined after equilibration regarding gas temperature is reached. The first pressure may be measured while the first, the second, the fourth, the fifth and the sixth (and optionally also seventh and eighth) valve are closed.

After measuring the first pressure (related to the first measurement mode), the fourth valve (and optically also a seventh valve explained below) may be opened allowing the gas to expand from the first chamber into the at least one second chamber. Also, the second pressure (related to the first measurement mode) may be measured after equilibration (in particular regarding gas temperature) is reached. Thereby, for example, the pressure measured by the pressure sensors may be tracked and followed until the measured pressure does not change significantly thus the change is below a threshold after a predetermined time interval.

The arrangement (e.g. including a processor) may, besides the first pressure and the second pressure, also utilize the (previously known) volume of the first chamber and the second chamber and may utilize further calibration data as detailed below for volume determination.

According to an embodiment of the present invention, the controller is adapted to cause when in the second measurement mode: opening the second valve and the fourth valve (optionally the seventh valve), to allow filling the second chamber with gas from the third chamber, closing the second valve and measuring a first pressure related to the second measuring mode using the pressure sensor (e.g. after equilibration is reached), e.g. while the first, second, third, fifth and sixth and seventh and eighth valve are closed; opening the third valve, to allow expanding the gas also into the first chamber and measuring a second pressure related to the second measuring mode, wherein the arrangement is adapted to calculate the volume of the sample based on the first pressure and the second pressure both related to the second measuring mode.

For example, the fourth valve and the second valve may be opened simultaneously or subsequently. If a larger volume as the volume of the second chamber is desired to be filled with gas, optionally also the seventh valve may be opened. The seventh valve may connect the second chamber to another second chamber. The second chamber and optionally also the other second chamber may be filled with the measurement gas until a target pressure is reached within the second chamber (and optionally the other second chamber) and also in the second gas path and the fourth gas path. When this target pressure is reached, the second valve may be closed. Then, in particular after reaching an equilibration, the first pressure (related to the second measurement mode) may be measured by the pressure sensor. During measurement of the first pressure, the first, the second, the third, the fifth and sixth and also seventh and eighth valve may be closed.

After having measured the first pressure (related to the second measurement mode), the third valve may be opened thereby connecting the second chamber with the first chamber and allowing expanding the gas across the second chamber as well as the first chamber and the third gas path. After equilibration has been reached (for example determined by following the measured pressure and the measured pressure does not change significantly over time), the second pressure (related to the second measurement mode) may be measured. In the second measurement mode, the arrangement (processor) calculates the volume of the sample based on the first pressure and the second pressure (both related to the second measurement mode) and optionally also based on known inner volumes of the first chamber, the second chamber, the fourth gas path and the third gas path.

Further, calculating the volume of the sample during any of the measurement modes may also be based on volumes of portions of the first gas path, in particular a volume of the first gas path between the first valve and the first chamber. Further, the calculation may be based on a portion of the second gas path, namely the portion between the second valve and the second chamber. Thus, according to embodiments of the present invention, at least volumes of portions of the gas paths may be considered for calculating the sample volume. These particular portions of the gas paths may be pre-known and may be stored in an electronic storage, for example as calibration data.

According to an embodiment of the present invention, the controller is adapted to cause at least one of: after measuring the second pressure related to the first measuring mode: opening the fifth valve, to allow venting the gas from the first chamber and the second chamber to the gas sink; and after measuring the second pressure related to the second measuring mode: opening the sixth valve, to allow venting the gas from the first chamber and the second chamber to the gas sink.

Thereby, venting the system to a same gas sink may be provided without physically altering any gas path.

According to an embodiment of the present invention, at least one of the first valve, the second valve, the third valve, the fourth valve, (in particular the fifth valve and the sixth valve), includes an unidirectional valve having an input side being leak tight.

An unidirectional valve may have only one side, namely the input side (also referred to as supply side), which is leak tight. The unidirectional valve may withstand gas leakage only from the input side but not from the output side (outlet side) of the respective valve. The unidirectional valve may have a substantially smaller dimension and size and weight compared to a bidirectional valve having two leak tight sides. Thereby, the complexity, dimension and weight of the arrangement may be reduced. Furthermore, also the fifth valve and the sixth valve and potentially the eighth valve and the seventh valve may include or be an unidirectional valve having one input side being leak tight.

According to an embodiment of the present invention, at least one of the following applies: an input side of the first valve faces and/or is connected to the first chamber; an input side of the second valve faces and/or is connected to the second chamber; an input side of the third valve faces/is connected to the pressure sensor; an input side of the fourth valve faces and/or is connected to the pressure sensor; the input side of the fourth valve is connected to the first chamber, if the third valve is in an open state; the input side of the third valve is connected to the second chamber, if the fourth valve is in an open state.

When the input side of the first valve faces or is connected to the first chamber, the first valve may, when the first valve is in the closed state, effectively prevent leakage of the gas from the first chamber via the first valve. When the second valve faces or is connected to the second chamber, the second valve may, when in the closed state, effectively prevent leakage of the gas from the second chamber via the second valve. When the third valve faces or is connected to the pressure sensor, it may prohibit gas leakage via the third valve for example in the second measurement mode when the first pressure (related to the second measurement mode) is to be measured after filling the second chamber. When the fourth valve faces or is connected to the pressure sensor, it may effectively prohibit gas leakage through the fourth valve in the first measurement mode after the first chamber has been filled with the gas and the first pressure (related to the first measurement mode) is to be measured. Thereby, the first as well as the second measurement mode may be performed.

According to an embodiment of the present invention, the arrangement further comprises at least one of: a seventh gas path including a seventh valve and connecting the second chamber to another second chamber; and an eighth gas path including an eight valve on one end connected to the first valve, the second valve and the gas entry path and on another end connected to another gas sink. The eighth valve may on one end connected with its input side, to output sides of the first valve and the second valve and connected to the gas entry path.

The seventh gas path and the second chamber provide the opportunity to initially fill a higher volume of gas or a larger quantity of gas into the second chamber as well as into the other second chamber. This gas contained in the second chamber as well as the other second chamber may then be expanded into the first chamber. In the first measurement mode however, first the first chamber may be filled with the gas and the gas may be expanded into the combination of the second chamber and the other second chamber. Thereby, different measurement configurations depending on the sample size or volume or other consideration are provided.

If a larger volume than the volume of the second chamber is desired to be filled with gas, optionally also the seventh valve may be opened. The seventh valve may connect the second chamber to another second chamber. The second chamber and optionally also the other second chamber may be filled with the measurement gas until a target pressure is reached within the second chamber (and optionally the other second chamber) and also in the second gas path and the fourth gas path.

According to an embodiment of the present invention, the arrangement further comprises a processor adapted to calculate the volume of the sample based on at least pressure measurements and volumes of the first chamber and the second chamber (e.g. using the Boyle-Mariotte law); and an electronic storage accessible to the processor and containing volume calibration data for the first chamber and the second chamber for calculating the sample volume.

The processor may for example comprise or execute a computer program which has been loaded into a memory with which the processor is in communication. The calculation may utilize the Boyle-Mariotte law as known from thermodynamics. The Boyle-Mariotte law may assume the validity of the ideal gas equation. In other embodiments, not the Boyle-Mariotte law assuming an ideal gas, but a modified equation may be utilized taking into account deviations of a real gas from the behavior of an ideal gas. The processor may be communicatively connected to the controller, for example also supplying control signals to the controller for appropriately controlling the valves according to a measurement program.

The processor may also be communicatively connected to the pressure sensor to receive pressure measurement signals. Further, the processor may be adapted or may be communicatively connected to one or more temperature sensors being arranged to measure the temperature of the different chambers and/or the gas paths. The processor may receive one temperature measurement of a temperature sensor configured to measure the temperature of a metal assembly harboring (or being in thermal contact with) all chambers as well as all gas paths. It may then be assumed that all sample chambers and gas paths substantially have the same temperature as determined by the temperature measurement sensor or the respective temperatures of the different elements may be derived from the temperature as measured by the temperature sensor utilizing temperature calibration data for example.

It should be understood, that features, individually or in any combination, disclosed, provided, explained or applied to an arrangement for measuring a volume of a solid sample also apply, individually or in any combination, to a manufacturing method for manufacturing an arrangement for measuring a volume of a solid sample, according to embodiments of the present invention, and vice versa.

According to an embodiment of the present invention it is provided a method for manufacturing an arrangement for measuring a volume of a solid or liquid sample, the method comprising: providing a first chamber for accommodating the sample; providing at least one second chamber connectable to the first chamber; providing a third chamber, being connectable to a gas supply source and being connected to a gas entry path leading to at least one of the first chamber and the second chamber; providing a temperature equalization system configured to temper at least the first chamber, the second chamber and the third chamber to substantially a same temperature; providing a pressure sensor; arranging and connecting plural gas paths comprising plural valves such as to allow, filling gas out of the third chamber into at least one of the first chamber and the second chamber, and measuring a pressure in at least one of the first chamber and the second chamber.

Embodiments of the present invention provide an arrangement and a corresponding manufacturing method in which the temperature of the gas inside the first chamber (also referred to as sample chamber) and the second chamber (also referred to as the reference chamber) as well as the third chamber (also referred to as acclimation chamber) are substantially the same. Thus, introducing gas from the third chamber into either one the first chamber or the second chamber will not disturb the thermal system thereby decreasing equilibration time for the temperature of the gas filled into either one of the first or the second chamber to actually assume the temperature of the surrounding chamber wall, i.e. corresponding substantially to the temperature of the metal assembly.

Thus, the third chamber may function as an acclimation or conditioning chamber which is been installed in addition to the sample chamber and the reference chamber and having a sufficiently large volume and sharing the same thermal control system with the first chamber and the second chamber. The temperature of gas being introduced into the sample chamber or reference chamber has thus already reached the temperature which is also prevailing within the first chamber and/or the second chamber. Thereby, advantageously, a pycnometer with highest accuracy is provided, since the temperature of the gas within the different chambers ideally should be uniform between the sample chamber and the expansion chamber or reference chamber.

According to embodiments of the present invention, only gas is admitted to the first chamber or the second chamber which has been equilibrated to the temperature of the first chamber or the second chamber, by filling the gas from the third chamber into the first chamber or the second chamber. According to embodiments of the present invention, the waiting time for the first pressure or the other first pressure to reach a steady value is shorter than using a conventionally known arrangement or instrument. In the prior art solution, there might have been a big temperature difference between the instruments working temperature and the initial gas temperature which may normally be room temperature.

According to embodiments of the present invention, the pycnometric measurement performed by the arrangement may be conducted at a gas temperature of between 5° C. and 50° C. A corresponding target temperature may be adjusted using or controlling the tempering equipment to a particular target temperature. In particular, when measurements are performed with the arrangement at a target temperature different from the room temperature or ambient temperature, it may be especially advantageous to temper the gas contained within the third chamber already to the target temperature before filling the gas into the first chamber or the second chamber. According to embodiments of the present invention, the gas is introduced at the instruments working temperature (or target temperature).

The acclimation chamber may be a third volume in the metal block or metal assembly. In particular, the knowledge of the exact volume of the third chamber may not be necessary and it may not be necessary to provide a pressure transducer for exactly measuring the pressure within the conditioning chamber. The conditioning chamber may be connected to a gas supply source providing a particular filling pressure.

In order to improve the heat transmission between the gas within the third chamber and the metal material of the metal assembly, the inner space of the third chamber may be filled with a material (like metal wool) that increases the surface contact area with which the gas contained within the third chamber may exchange heat. Thereby, the gas contained within the third chamber may equilibrate with the temperature of the metal assembly even faster.

In particular, a gas input line (for example from a gas source) may directly be connected to the third chamber or acclimation chamber. This may also be beneficial, since the input line may normally be at higher pressure than the instrument's working pressure. Thus, the acclimation chamber may hold more gas, meaning higher residence time for the gas in the chamber before it is needed in the instrument. Furthermore, introduction of the third chamber into the arrangement may improve the measurement accuracy of the arrangement, in particular pycnometer.

Conventionally the gas may have been admitted to the sample chamber (or the reference chamber, depending on measurement modes) at a temperature that is different from the entire arrangement temperature or temperature of the metal assembly, and it may be have been very important to wait until the gas reached the instrument's temperature. Embodiments of the present invention reduce the waiting time.

In order to know that the gas actually reached the equilibration or the temperature of the metal assembly, normally, the pressure in the chamber may be tracked until it is stable. Thereby, a definition of "pressure stability" may be required. Usually, equilibration is considered to be complete, when the variation of the pressure within a particular time interval is lower than a threshold or a limit or when the variation of the pressure with time is lower than a limit (for example the pressure changes less than 0.001 Torr/min). This parameter may normally be chosen also considering the measurement duration and therefore does not always assure perfect temperature stabilization.

According to an embodiment of the present invention, a relatively strict threshold is chosen for defining that equilibration has been completed. For example, the threshold to be reached for judging that the equilibration is completed may be set to be for example to 0.3 mTorr/min. Since the threshold may be stricter than conventionally defined, also the measurement accuracy may be higher than conventionally observed.

DETAILED DESCRIPTION OF ILLUSTRATED EMBODIMENTS

Figure 1:
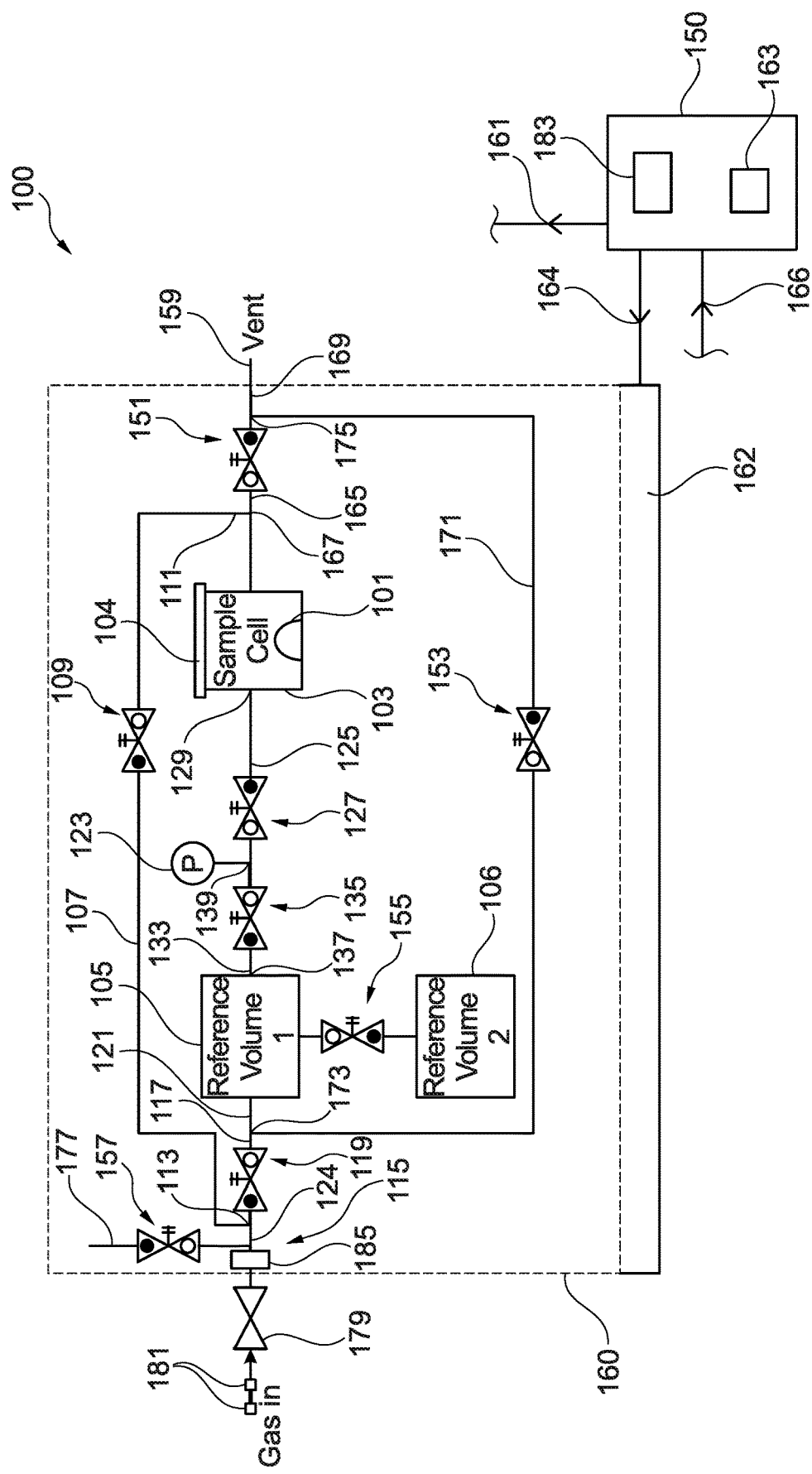
FIG. 1 schematically illustrates as a fluid diagram an arrangement for measuring a volume of a solid sample according to an embodiment of the present invention.

The arrangement 100 for measuring a volume of a solid sample 101 illustrated in FIG. 1 comprises a first chamber 103 for accommodating the sample 101, at least one second chamber 105 (and optionally another second chamber 106) connectable to the first chamber 103. Furthermore, the arrangement 100 comprises a third chamber (also referred to as acclimation chamber) 185 connectable to a gas supply source 181 and connected to a gas entry path 115 leading to at least one of the first chamber 103 and the second chamber 105. Furthermore, the arrangement 100 comprises a pressure sensor 123 and plural gas paths comprising plural valves which will be explained in detail below.

Furthermore, the arrangement 100 comprises a metal assembly 160 which is at least in thermal contact with or harbors or includes the first chamber 103, the second chamber 105, the third chamber 185 and at least a portion of at least one of the gas paths and being in thermal contact with at least one of the valves.

The metal assembly 160 at least partly implements a temperature equalization system that is configured to temper at least the first chamber 103, the second chamber 105 and the third chamber 185 to substantially a same temperature.

The gas paths and valves, in particular gas paths 107, 117, 123, 133, 125, 175, 171 and in particular the valves 119, 109, 135, 127, 151, 153 and 155, 157 are arranged and connected such as to allow filling gas out of the third chamber 185 into at least one of the first chamber 103 and the second chamber 105 and to allow measuring a pressure in at least one of the first chamber 103 and the second chamber 105.

Further, the arrangement 100 comprises a first gas supply path 107 including a first valve 109, wherein the first gas path 107 is on one end 111 connected via the first valve 109 to the first chamber 103 and on the other end 113 connected to a gas entry path 115. The arrangement further comprises a second gas supply path 117 including a second valve 119, the second gas path 117 being on one end 121 connected, via the second valve 119, to the second chamber 105 and on another end 124 connected to the gas entry path 115.

The arrangement 100 further comprises a pressure sensor 123 and a third gas measurement path 125 including a third valve 127, the third gas path 125 being on one end 129 connected to the first chamber 103 and on the other end 139 connected, via the third valve 127, to the pressure sensor 123. The arrangement 100 further comprises a fourth gas measurement path 133 including a fourth valve 135, the fourth gas path 133 being on one end 137 connected to the second chamber 105 and on the other end 139 connected, via the fourth valve 135, to the pressure sensor 123.

The arrangement 100 further comprises a controller 150 adapted to control a state of the first valve 109, the second valve 119, the third valve 127, the fourth valve 135 and in particular also the state of a fifth valve 151, a sixth valve 153, a seventh valve 155 and an eighth valve 157, such as to allow measurement of the sample volume selectively according to a first measurement mode or a second measurement mode. Therefore, the controller receives pressure measurement signals 166 from the pressure sensor 123.

In the first measurement mode, the first chamber 103 in which the sample 101 is accommodated is filled with gas from the gas entry path 115 and the gas is later expanded into the second chamber 105. In the second measurement mode, the second chamber 105 is filled with gas from the gas entry path 115 and the gas is later expanded into the first chamber 103 in which the sample 101 is accommodated. In the first as well as in the second measurement mode, the gas is vented via a gas sink 159.

The controller 150 provides, for controlling the valves, valve control signals 161 to the respective valves. When in the first measurement mode, the controller 150 is adapted to cause by the control signals 161 opening the first valve 109 and the third valve 127, to allow filling the first chamber 103 with gas from the gas entry path 115, closing the first valve 109 and measuring a first pressure (related to the first measurement mode) using the pressure sensor 123. Further, the controller 150 causes opening the fourth valve 135 and optionally the seventh valve 155, to allow expanding the gas into the at least one second chamber 105 and in particular also optionally into another second chamber 106 via the seventh valve 155. Then, a second pressure (related to the first measurement mode) may be measured and a processor 163 comprised in the controller 150 calculates the volume of the sample 101 based on the first pressure and the second pressure.

When in the second measurement mode, the controller 150 is adapted to cause opening the second valve 119 and the fourth valve 135, to allow filling the second chamber 105 with gas from the gas entry path (and optionally also the other second chamber 106 by further opening the seventh valve 155). Then, a first pressure (related to the second measurement mode) may be measured using the pressure sensor 123. Further, the controller 150 causes opening the third valve 127 to allow expanding the gas into the first chamber 103 and measuring a second pressure (related to the second measurement mode). The processor 163 is then adapted to calculate the volume of the sample 101 based on the first pressure and the second pressure (both related to the second measurement mode).

For venting purposes, the arrangement 100 comprises a fifth gas vent path 165 including the fifth valve 151, wherein the fifth gas path 165 is on one end 167 connected, via the fifth valve 151 to the first chamber 103 and on the other end 169 connected to the gas sink 159. The arrangement further comprises a sixth gas vent path 171 including the sixth valve 153, the sixth gas path 171 being on one end 173 connected to the second chamber 105 and on the other end 175 connected to the gas sink 159.

In the illustrated embodiment, the valves are implemented or configured as unidirectional two-way latching valves having an input side and an output side or supply side and outlet side, wherein the supply or input side is depicted as an open circle and the output side is depicted as a closed or filled circle. As can be taken from FIG. 1, the input side of the first valve 109 faces the first chamber 103. Further, the input side of the second valve 119 faces the second chamber 105. Further, the input side of the third valve 127 faces the pressure sensor 123. Furthermore, the input side of the fourth valve 135 also faces the pressure sensor 123. Furthermore, the input side of the fourth valve 135 is connected to the first chamber 103, if the third valve 127 is in an open state. Further, the input side of the third valve 127 is connected to the second chamber 105, if the fourth valve 135 is in an open state.

The arrangement 100 further comprises an eighth valve 157 on one end connected to the first valve 109, the second valve 119 and the gas entry path 115 and on another end connected to another gas sink 177. The arrangement 100, in particular the controller 150, includes an electronic storage 183 containing volume calibration data and/or temperature calibration data.

The gas entry path 115 includes a gas supply valve 179 being connected with a gas container 181. The gas entry path 115 may or may not include an acclimation chamber 185. Thus, in embodiments the acclimation chamber 185 is not present.

The arrangement 100 illustrated in FIG. 1 however further comprises a third chamber 185 for acclimation purposes connected to the gas supply source 181, 179 and providing the gas entry path 115 into the first gas path 107 and the second gas path 117, wherein the third chamber 185 is in thermal contact or harbored in a metal assembly 160. The metal assembly 160 is also in thermal contact with or harbors the first chamber 103, the second chamber 105 and the gas paths 107, 117, 133, 125, 165, 171 and all the valves 109, 151, 153, 155, 135, 127, 119, 157. A tempering equipment 162 for example comprising a Peltier element is further provided and in thermal contact with the metal assembly 160 for tempering the metal assembly 160 to a desired temperature. The tempering equipment 162 is controlled by control signals 164 from the controller 150.

The third chamber 185 may have a volume being for example in a range of 0.1 and 10 times the volume of the second chamber 105 or the first chamber 103. Thus, the third chamber 185 is not drawn to scale in FIG. 1. The third chamber may be filled with a not illustrated mesh filter or metal mesh, for example a knitted wire mesh filter. It should be noted that the third chamber 185 is an optional feature of the arrangement 100 and may be absent in other embodiments of the present invention.

As is illustrated in FIG. 1, the sample chamber 103 is closed by a lid 104. For loading the sample 101 into the first chamber 103, the lid 104 may be removed by a user.

According to an embodiment the arrangement comprises the second gas path 121, the second valve 119, the fourth gas path 133, the fourth valve 135, the third gas path 125, the third valve 127, the fifth gas path 165 and the fifth valve 151. However, the arrangement only optionally may comprise the other gas paths and valves illustrated in FIG. 1.

The size of the third chamber 185 may substantially be of the order of the size of the first chamber 103 or the second chamber 105. It may for example be between 0.1 times and 100 times the size of the first chamber 103 or the second chamber 105.

Figure 2:
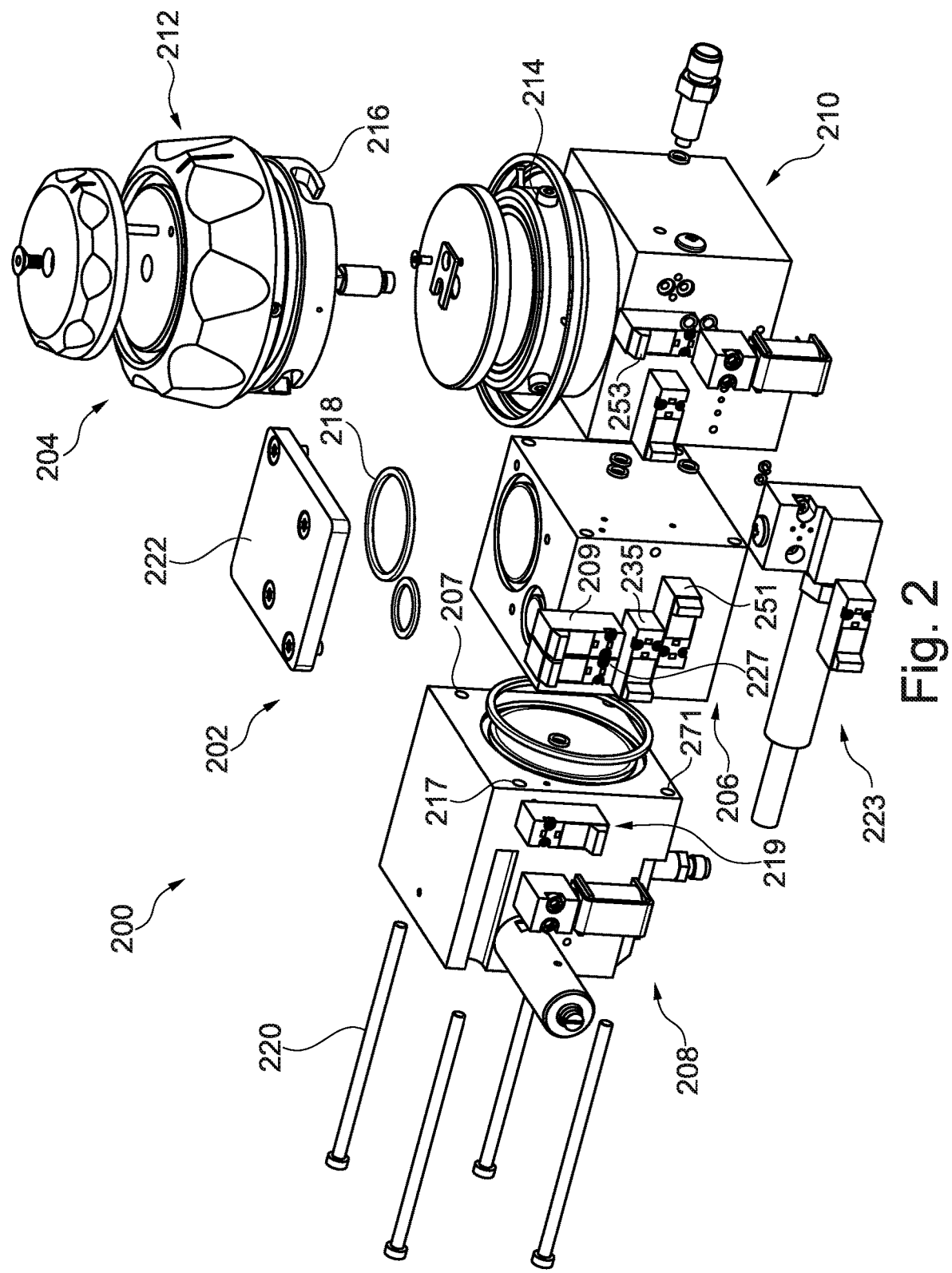
FIG. 2 illustrates an exploded three-dimensional view of the arrangement illustrated in FIG. 1 according to an embodiment of the present invention.

FIG. 2 illustrates in an exploded perspective view a realization of an arrangement for measuring a volume of a solid sample according to an embodiment of the present invention. Elements similar in structure and/or function in FIGS. 1 and 2 are labelled with reference signs differing only in the first digit. A description of one element not in detail described in one particular embodiment may be taken from the description of this respective element in the context of another embodiment or figure.

The arrangement 200 comprises a metal assembly 202 comprising a first metal portion 210 harboring a not visible first chamber, a second metal portion 206 harboring a not visible second chamber and a third metal portion 208 harboring the not visible third chamber. Therein, the first metal portion 210 is (in the assembled arrangement 200) mounted at a side flat surface to a side flat surface of the second metal portion 206 or another side flat surface of the second metal portion 206 is mounted at a side flat surface of the third metal portion 208. Thereby, the first, the second and the third metal portions are arranged in a series.

The lid 204 for closing the first chamber harbored in the first metal portion 210 is also illustrated in FIG. 1 comprising a grip portion 212 allowing to twist or turn the lid 204 comprising a hook 216 for engaging or disengaging with engaging portions 214 connected to the first metal portion 210.

As can be seen in FIG. 2, some or all gas paths are realized by bores within the metal portions 210, 206, 208. For example, the first gas path 207, the second gas path 217 and the sixth gas path 271 are shown in portions as bores. Further, it can be taken from FIG. 2 that the valves are mounted at an external surface of the metal assembly 202. In particular, for example the second valve 219 (or another valve) is surface mounted at an external surface of the third metal portion 208. The third metal portion 208 may be covered with plate 222. The first valve 209, the third valve 227, the fourth valve 235, and/or the fifth valve 251 (or others) may be mounted at an external surface of the second metal portion. As can further be taken from FIG. 2, seal rings 218 provide gas tight connections between the different components when assembled. The three metal portions 210, 206, 208 may for example be mounted to each other using bolts 220. Further, the pressure sensor or pressure transducer 223 is shown and is also surface mounted to the metal assembly.

The third chamber is comprised in the third metal portion 208 as illustrated in FIG. 2. Bores within this metal portion 208 partly form paths of one or more gas paths allowing to fill in gas from the third chamber into the second chamber comprised within the second metal portion 206 or into the first chamber comprised in the first metal portion 210 of the metal assembly 202.

When a normal solid is to be measured, the second measurement mode may be adopted, wherein first the second chamber 105 (or optionally also the other second chamber 106) is filled with gas. Thereafter, after measuring the first pressure (related to the second measurement mode), or the gas may be expanded into the first chamber, i.e. the sample chamber.

If a foam or a similar type of material is to be measured, the first measurement mode may be adopted. Thus, the first chamber may be pressurized first, i.e. filled with gas, swapping thereby the function of either chamber. Thereby, the pressure transducer may be kept on the first chamber but swapping the sample from the first to the second chamber thereby demanding open access to be provided to both chambers.

To derive the volume of the sample, also an ambient pressure may be utilized. The ambient pressure may for example be measured by communicating the gas sink 159 with the pressure sensor 123, 223 by the operation of the valves, wherein the gas sink 159 is at atmospheric pressure.

The ambient pressure may for example be measured by opening all valves (for example with exception of the first valve 109 and/or the second valve 119 and/or the gas supply valve 179) and measuring the pressure by the pressure sensor 123, 223. For evaluating the experiment and deriving the sample volume, the ideal gas law may be used. As the amount of gas molecules is constant in the system before and after expansion, the Boyle-Mariotte law may be employed to calculate the unknown sample volume Vs: The unknown sample volume may (e.g. for the first measurement mode) be calculated as $$Vs = Vc - (Va/(P1/P2 - 1)),$$

wherein P1 is the first pressure (e.g. related to the first measurement mode), P2 is the second pressure (e.g. related to the first measurement mode), Vc is the volume of the first chamber and Va is the volume of the second chamber.

The first measurement mode may be better suited for the analysis of foam, for example. However, measuring fine powders in the first measurement mode may have the risk of contamination of the instrument. In contrast, by using the second measurement mode applied to fine powders, the risk of contamination may be low.

In the prior art, the introduction of measurement gas at room temperature during the purging step of the measuring process into the different chambers may introduce a disturbance to the thermal system, if the chamber temperature differs from the ambient temperature. This conventionally causes an elongated measuring time or inaccurate result, if a too short equilibration time is chosen. In the prior art, there is no control of the temperature of the gas before it is introduced into the sample or reference chambers. Conventionally, the gas enters the analysis chamber at the time of measurement with ambient temperature. Especially, if the chamber temperature is different from the ambient temperature, the equilibration of the gas takes a significant amount of time which means that in the state of the art, the full advantage of the thermal control cannot be leveraged.

According to embodiments of the present invention, a conditioning chamber, a reference chamber and a sample chamber are provided and all these volumes or chambers may share the same thermal control system and may have the same insulation. The conditioning chamber volume may be dimensioned in a way that the entire gas amount needed for an analysis step may be contained and pre-conditioned. To improve the thermal transfer from the manifold to the gas, the condition chamber volume contains a metal mesh to increase the surface participating in the heat transfer.

Furthermore, embodiments of the present invention also include arrangements which do not allow bidirectional measurements. These embodiments for example do not include the first valve 109 and/or the sixth valve 153. These embodiments for example may allow to first fill the second chamber 105 and then expand the gas into the first chamber 103, thus providing the second measurement mode, while the first measurement mode may not be possible. Venting the system may be performed via the fifth valve 151 to vent 159.

Other embodiments for example do not include the second valve 119 and/or the first valve 109. These embodiments for example may allow to first fill the first chamber 103 and then expand the gas into the second chamber 105, thus providing the first measurement mode, while the second measurement mode may not be possible. Venting the system may be performed via the sixth valve 153 to vent 159.

Embodiments of the present invention may or may not enable two different volume measurement modes. At least a measurement mode may be supported, wherein e.g. first the second chamber may be filled with gas which is then expanded into the first chamber.

It should be noted that the term "comprising" does not exclude other elements or steps and the article "a" or "an" does not exclude a plurality. Also, elements described in association with different embodiments may be combined.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. An arrangement for measuring a volume of a solid or liquid sample, comprising:
   a first chamber for accommodating the sample;
   at least one second chamber connectable to the first chamber;
   a third chamber connectable to a gas supply source and connected to a gas entry path leading to at least one of the first chamber and the second chamber;
   a pressure sensor;
   plural gas paths including the gas entry path comprising plural valves; and
   a temperature equalization system configured to temper at least the first chamber, the second chamber and the third chamber to substantially a same temperature,
   wherein the gas paths and the valves are arranged and connected such as to allow, filling gas out of the third chamber into at least one of the first chamber and the second chamber, and
   measuring a pressure in at least one of the first chamber and the second chamber,
   wherein the temperature equalization system comprises:
   a metal assembly in thermal contact with the first chamber, the second chamber, the third chamber and at least a portion of at least one of the gas paths and in thermal contact with at least one of the valves,
   wherein the third chamber encloses a metallic material providing high surface area, wherein the metallic material is in thermal contact with the metal assembly,
   wherein the metallic material comprises at least one of: a fibrous web, a sintered structure, a loose material, a mesh, a fleece, a fabric, a non-woven fabric, a woven fabric, and a mat.

2. The arrangement according to claim 1, wherein a size of an inner volume of the third chamber amounts to between 0.1 times and 100 times a size of an inner volume of one of the first chamber and the second chamber.

3. The arrangement according to claim 1, further comprising:
   a tempering equipment for tempering the metal assembly to a desired temperature, and
   an insulation surrounding the metal assembly.

4. The arrangement according to claim 1, wherein the metal assembly comprises:
   a first metal portion harboring the first chamber,
   a second metal portion harboring the second chamber, and
   a third metal portion harboring the third chamber,
   wherein the first metal portion is mounted at a side flat surface to a side flat surface of the second metal portion and another side flat surface of the second metal portion is mounted at a side flat surface of the third metal portion.

5. The arrangement according to claim 1, wherein the gas paths and valves comprise at least one of:
   a first gas path including a first valve, the first gas path being on one end connected, via the first valve, to the first chamber and on the other end connected to the gas entry path; and
   a second gas path including a second valve, the second gas path being on one end connected, via the second valve, to the second chamber and on the other end connected to the gas entry path.

6. The arrangement according to claim 5, comprising at least one of:
   a third gas path including a third valve, the third gas path being on one end connected to the first chamber and on the other end connected, via the third valve, to the pressure sensor; and
   a fourth gas path including a fourth valve, the fourth path being on one end connected to the second chamber and on the other end connected, via the fourth valve, to the pressure sensor.

7. The arrangement according to claim 6, comprising at least one of:
   a fifth gas path including a fifth valve, the fifth gas path being on one end connected, via the fifth valve, to the first chamber and on the other end connected to a gas sink; and
   a sixth gas path including a sixth valve, the sixth gas path being on one end connected, via the sixth valve, to the second chamber and on the other end connected to a gas sink.

8. The arrangement according to claim 7, further comprising:
a controller adapted to control a state of at least one of the first valve, the second valve, the third valve, the fourth valve, such as to allow measurement of the sample volume selectively according to a first measurement mode or a second measurement mode,
wherein in the first measurement mode, the first chamber in which the sample is accommodated is filled with gas from the third chamber and the gas is later expanded into the second chamber,
wherein in the second measurement mode, the second chamber is filled with gas from the third chamber and the gas is later expanded into the first chamber in which the sample is accommodated.

9. The arrangement according to claim 8, wherein the controller is adapted to cause when in the first measurement mode:
opening the first valve and the third valve, to allow filling the first chamber with gas from the third chamber, closing the first valve and measuring a first pressure related to the first measurement mode using the pressure sensor;
opening the fourth valve, to allow expanding the gas also into the at least one second chamber and measuring a second pressure related to the first measurement mode, wherein the arrangement is adapted to calculate the volume of the sample based on the first pressure and the second pressure both related to the first measurement mode.

10. The arrangement according to claim 8, wherein the controller is adapted to cause when in the second measurement mode:
opening the second valve and the fourth valve, to allow filling the second chamber with gas from the third chamber, closing the second valve and measuring a first pressure related to the second measurement mode using the pressure sensor;
opening the third valve, to allow expanding the gas also into the first chamber and measuring a second pressure related to the second measurement mode, wherein the arrangement is adapted to calculate the volume of the sample based on the first pressure and the second pressure both related to the second measurement mode.

11. The arrangement according to claim 10, further comprising:
a processor adapted to calculate the volume of the sample based on at least pressure measurements and volumes of the first chamber and the second chamber; and
an electronic storage accessible to the processor and containing volume calibration data for the first chamber and the second chamber for calculating the sample volume.

12. The arrangement according to claim 8, wherein the controller is adapted to cause at least one of:
after measuring the second pressure related to the first measurement mode: opening the fifth valve, to allow venting the gas from the first chamber and the second chamber to the gas sink; and
after measuring the second pressure related to the second measurement mode: opening the sixth valve, to allow venting the gas from the first chamber and the second chamber to the gas sink.

13. The arrangement according to claim 7, further comprising at least one of:
a seventh gas path including a seventh valve and connecting the second chamber to another second chamber; and
an eighth gas path including an eighth valve on one end connected to the first valve, the second valve and the gas entry path and on another end connected to another gas sink.

14. The arrangement according to claim 6, wherein at least one of the first valve, the second valve, the third valve, the fourth valve, includes an unidirectional valve having an input side being leak tight.

15. The arrangement according to claim 14, wherein at least one of the following applies:
an input side of the first valve faces to the first chamber;
an input side of the second valve faces to the second chamber;
an input side of the third valve faces to the pressure sensor;
an input side of the fourth valve faces to the pressure sensor;
the input side of the fourth valve is connected to the first chamber, if the third valve is in an open state;
the input side of the third valve is connected to the second chamber, if the fourth valve is in an open state.

16. The arrangement according to claim 6, wherein at least one of the following applies:
the gas entry path includes a gas supply valve; and
at least one of the first valve, the second valve, the third valve, the fourth valve, includes a solenoid valve configured as a two-way latching valve.

17. A method for manufacturing an arrangement for measuring a volume of a solid or liquid sample, the method comprising:
providing a first chamber for accommodating the sample;
providing at least one second chamber connectable to the first chamber;
providing a third chamber, being connectable to a gas supply source and being connected to a gas entry path leading to at least one of the first chamber and the second chamber;
providing a temperature equalization system configured to temper at least the first chamber, the second chamber and the third chamber to substantially a same temperature;
providing a pressure sensor;
arranging and connecting plural gas paths comprising plural valves such as to allow,
filling gas out of the third chamber into at least one of the first chamber and the second chamber, and
measuring a pressure in at least one of the first chamber and the second chamber,
wherein the temperature equalization system comprises:
a metal assembly in thermal contact with the first chamber, the second chamber, the third chamber and at least a portion of at least one of the gas paths and in thermal contact with at least one of the valves,
wherein the third chamber encloses a metallic material providing high surface area, wherein the metallic material is in thermal contact with the metal assembly,
wherein the metallic material comprises at least one of: a fibrous web, a sintered structure, a loose material, a mesh, a fleece, a fabric, a non-woven fabric, a woven fabric, and a mat.

* * * * *